Dec. 20, 1960

A. J. HURDLE 2,964,992

DIFFERENTIAL REFRACTOMETER CELL

Filed Feb. 7, 1956

INVENTOR.
Arthur J. Hurdle

BY *Frank J. Dobrovolny*

AGENT

Dec. 20, 1960  A. J. HURDLE  2,964,992
DIFFERENTIAL REFRACTOMETER CELL
Filed Feb. 7, 1956
5 Sheets-Sheet 2

INVENTOR.
Arthur J. Hurdle
BY
AGENT

Dec. 20, 1960 A. J. HURDLE 2,964,992
DIFFERENTIAL REFRACTOMETER CELL
Filed Feb. 7, 1956 5 Sheets-Sheet 4

INVENTOR.
Arthur J. Hurdle
BY
AGENT

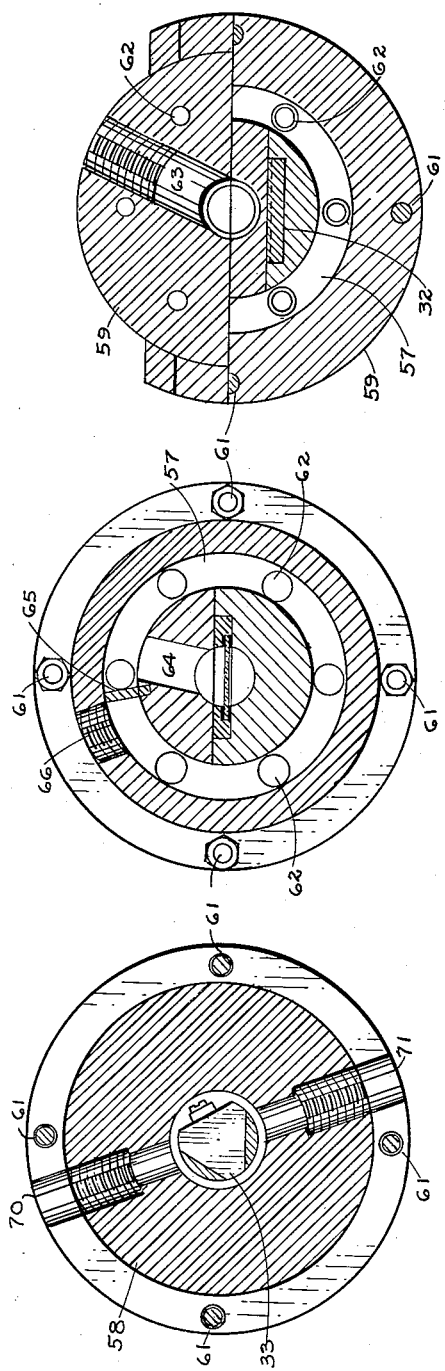

United States Patent Office 2,964,992
Patented Dec. 20, 1960

2,964,992

DIFFERENTIAL REFRACTOMETER CELL

Arthur J. Hurdle, Niagara Falls, Ontario, Canada, assignor to E. I. du Pont de Nemours and Company, Wilmington, Del., a corporation of Delaware Filed Feb. 7, 1956, Ser. No. 563,949

4 Claims. (Cl. 88—14)

This invention relates to the use of optical refractometry in the control of liquid phase continuous processes.

Isotropic materials such as optically transparent liquids will deflect an obliquely incident ray of light entering from another medium of different density. Refraction of a specific medium as measured by the refractive index is dependent upon the wave length of light used, the temperature of the liquid and, to a slight extent, upon the pressure. Under standard conditions each liquid substance or mixture which is optically clear will have a characteristic degree of refraction (index of refraction), i.e. it will deflect a given ray of light by a certain angle from the angle of incidence. Variation in the degree of deflection with changing composition can be used to control the composition of the liquid by a suitable combination of a refractometer with an optical system containing a light source and means for effecting corrective control of the rate of feed of the components of the composition by way of a photo sensitive vacuum tube circuit whereby the change in the degree of refraction of a light beam is sensed and amplified to effect the correction. Difficulties with such systems are associated with the need for accurate temperature control of the liquids while in the refractive cells or elements, with avoidance of composition variations due to striated flow through the cells, and with making such operations continuous, especially where such process results in a viscous liquid product.

It is accordingly an object of the present invention to provide a device whereby a refractometer may be used to control the composition of a liquid phase process. It is also an object to provide a refractometer wherein the effluent from a liquid phase process can be used to maintain the temperature of the sample cell and the standard cell uniform and comparable at about the temperature of the process effluent. It is a further object to provide for a flow of liquid through the sample cell free from non-homogeneous striations or variations in density. A still further object is to operate a process the composition of which can be automatically and continuously controlled by the change in light refraction occasioned by a composition change. A still further object is the provision of means whereby a relatively viscous process effluent may pass through a refractometer and permit control to maintain effluent of constant composition by adjustment of the feed to the process by automatic response to a change in refraction of a light beam passing through the effluent. It is also an object to provide an effective means for positive automatic control of the single phase continuous catalytic polymerization of vinyl acetate in alcoholic solution.

I accomplish these and other objectives by passing a stream of liquid effluent product possessing optical transparency from a mixer or reactor through a sample refractometer cell in which the light refraction of the product is continuously and automatically compared with the refraction of a standard liquid, and thence passing the effluent around and in contact with the assembly of the sample cell with the adjoining standard cell in such a way as to maintain a substantially uniform and comparable temperature in both cells. The refractometer optical system is connected directly to the sample cell and serves as the light source and as the sensing means whereby variation in the angle of refraction in the sample cell is continuously translated into suitable adjustment of the feed rates of the raw materials fed to the mixer or reactor to maintain continuously a relatively constant composition of the product effluent.

The unique cell assembly comprises the combination of a lens in the sample cell adapted to direct a well defined beam of light through a section of the effluent flowing through the sample cell. The standard cell contains a mirror whereby the beam of light directed through the sample and standard cells is reflected back through both cells to the cell lens and thence into the refractometer sensing unit in which the variation from standard of the reflected light beam is translated into automatic adjustment of the feed entering the mixer or reactor to maintain a substantially constant effluent composition. The sample and standard cells are separated by an optically transparent window permitting both the incident and the reflected light beam from the mirror to pass therethrough. In the drawing the following figures will illustrate the significant elements of my invention.

Figure 5 is a cross-section of Figure 3 along the line as shown at 5'—5' of Figure 4.

Figure 6 is a cross-section of Figure 3 along the line as shown at 6'—6' of Figure 4.

Figure 7 is a cross-section of Figure 3 along the line as shown at 7'—7' of Figure 4 and is in part at an angle from the perpendicular.

Figure 1:
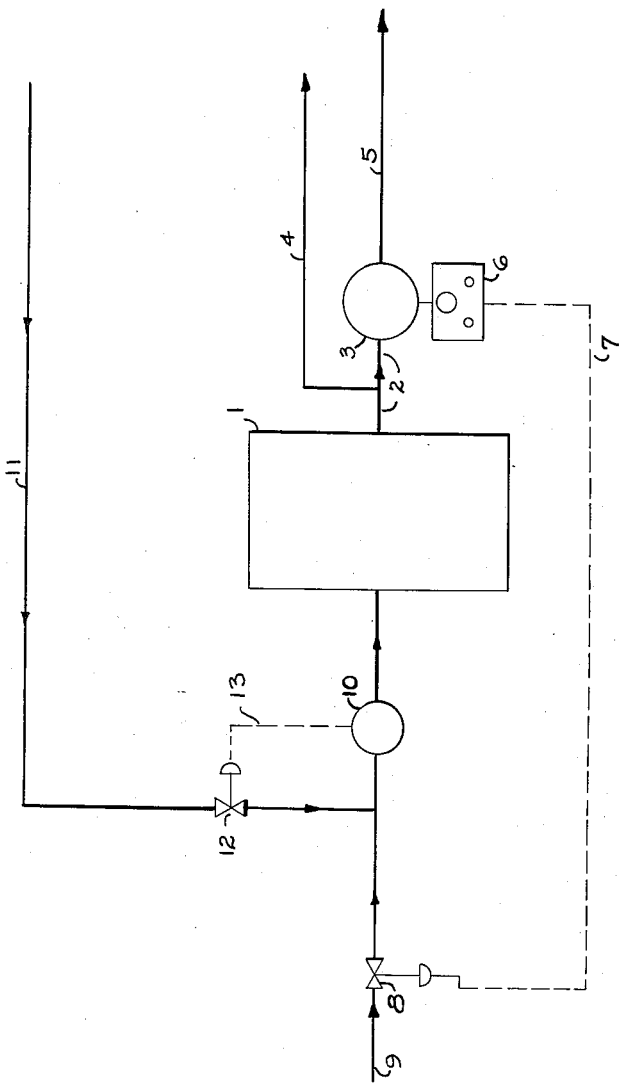
Figure 1 is a schematic diagram showing the relationship of the refractometer control to the process.

In the drawing each reference numeral refers to the same part in all of the figures wherever the part appears.

The effluent from a reactor or mixer 1 leaves by way of 2 and all or a sufficient fractional part of the effluent to be effective enters refractometer assembly 3 and leaves the refractometer by 5 after it has been automatically and continuously checked for conformity of light refraction with a standard sample contained therein. A part of the effluent leaving the reactor or mixer may by-pass the refractometer 3 if desired by way of pipe or line 4. The by-passed effluent may thereafter be combined with the effluent leaving the refractometer by way of 5. The refractive variation in the effluent is continuously recorded by means of an electrical signal sent to recorder controller 6 and by pneumatic means not shown causes a variation of air pressure in conduit 7 to control the flow of liquid through valve 8 in line 9 through which a raw material is fed into the reactor 1 by way of a density control unit 10 whereby the amount of feed of another component entering the system by way of line 11 through valve 12 is controlled by 10 by way of a pneumatic pressure line 13 according to a predetermined density standard so that the composition of the mixture of materials entering the reactor or mixer 1 is correlated with the composition required to produce an effluent from the reactor corresponding to the standard of refraction of a standard or reference material in the refractometer.

Figure 2:
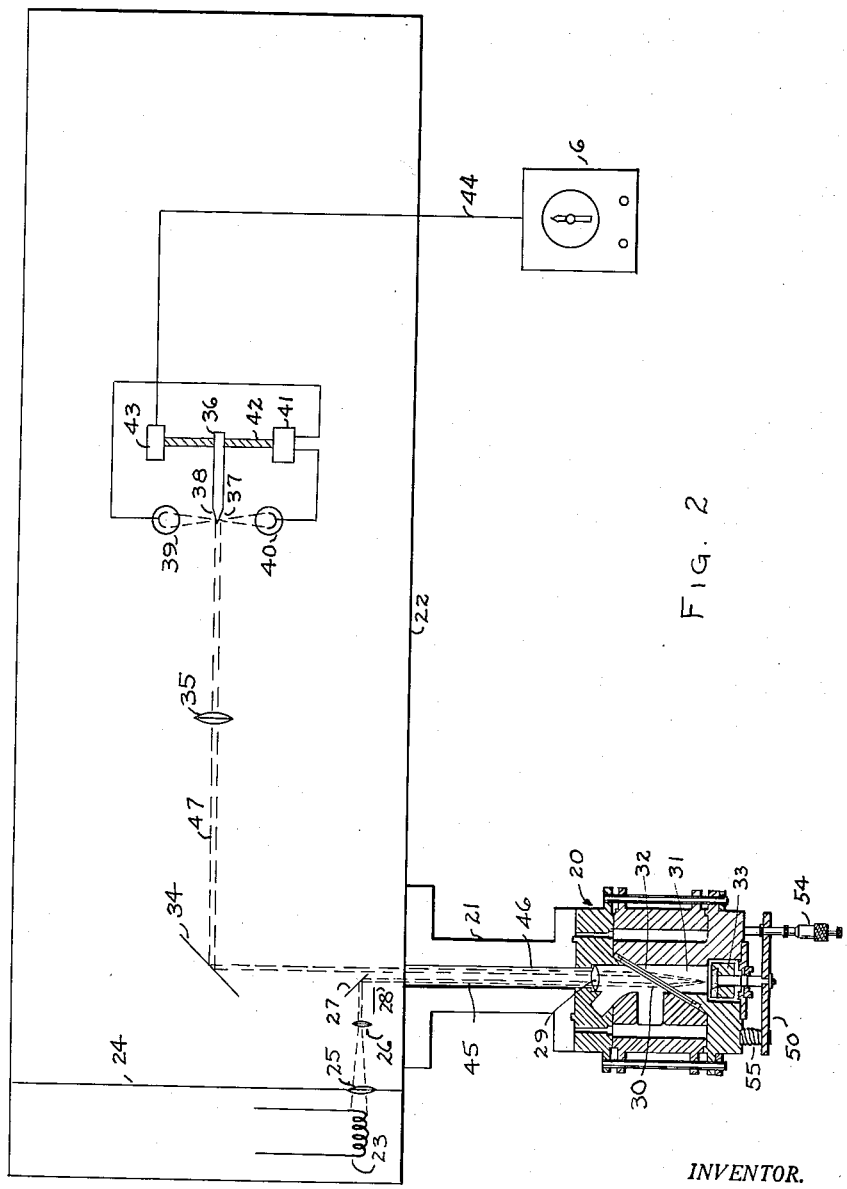
Figure 2 shows schematically the assembly of the refractometer with the light source and the sensing elements.
Figure 3:
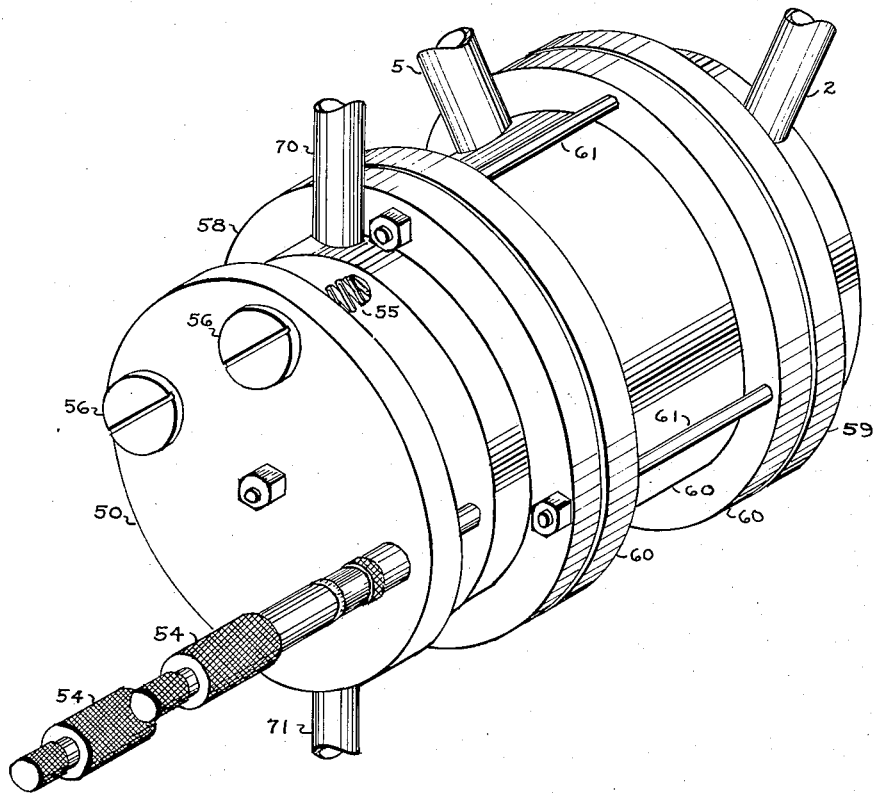
Figure 3 is an isometric view of the refractometer cell assembly from the mirror end.

The refractometer assembly 3 is shown in greater schematic detail in Figure 2. Refractometer cell assembly 20 shown in cross section is conveniently attached by extension or probe 21 to a housing 22 in which are located the light source 23, such as a mercury vapor lamp, and light directing and sensing elements separated by partition 24 provided with an optical aperture 25 conveniently consisting of a glass lens or window. A light condensing or focusing lens 26 is interposed between window 25 and a light shifting mirror 27 adapted to direct a light beam 45 into the refracting cell assembly 20 in optically clear pathway within extension 21, through a slit formed between the reflecting mirror 27 and plate 28. The light beam 45 leaving the slit between mirror 27 and plate 28 is slit-shaped and is directed through cell lens 29 which is at a slight angle to the optical axis of the passing light beam so as to throw spurious reflections from the flat lens face out of the optical path. The double dotted or broken line 45 indicates the approximate course of the light beam from its source and on through the refractometer assembly and thence into the beam splitting mirror 36 which directs the light to phototubes 39 and 40 to actuate the recording and control devices.

The continuously flowing effluent entering by way of 2 and passing through the interior of the sample cell 30 detailed later is separated from the standard cell contents 31 by optically transparent dividing window 32. Within the standard cell the face of the light beam reflecting mirror 33 is disposed at a slight angle from the axis of the optical light beam 45 impinging thereon. Thus the reflected light beam 46 will diverge at a small angle from the path of the entering beam 45. The refracted light beam 46 leaving the refracting cell assembly 20 by way of cell lens 29 is directed to light beam splitting mirror 36 by way of a focusing lens 35. Light beam shifting mirror 34 preferably changes the directions of the deflected light beam 46 for convenience of compact design of the instrument. Mirror faces 37 and 38 on the beam splitting mirror 36 form an acute angle with apex directed to the light beam 47 coming from reflecting mirror 33 by way of mirror 34, and when in zero or neutral position will split the light beam 47 so that approximately equal amounts of light will fall on phototubes 39 and 40. A motor at 41 not shown in detail will rotate shaft 42 according to impulses generated in the phototubes to keep the light beam splitting mirror in position to divide the light approximately equally by way of shaft 42 which is threaded. The variation in the position of the light beam is continuously transmitted from mirror positions transmitter 43 by electrical connection 44 to the recorder controller 6 which is a control instrument of standard design and requires no further discussion here.

Adjustment of the angle at which the refracted light beam is reflected by mirror 33 in the refractometer cell assembly is accomplished by means of mirror adjusting plate 50. Mirror 33 is securely attached to mount 51 which in turn is controlled from outside the cell assembly by way of rod 52 and ball socket seal 53. Rod 52 passes through adjusting plate 50, to which it is securely attached. Adjustment of plate 50 is effected by means of two micrometers 54 and two compression springs 55 with tension adjustment screws 56.

The standard cell space or cavity 31 and the sample cell cavity or space 30 as well as the encircling space 57 are substantially delimited by the interlocking assembly of three pieces or blocks or parts which preferably are machined to exact dimensions from any suitable material such as ferrous metal or alloy or plastic resistant to corrosion by the materials processed through the instrument. The reference or standard cell is contained within block 58. The window 32 is securely fastened within block 58 to provide optical communication with the sample cell which is largely comprised of block 59. The window is conveniently made of flat good quality optical glass fastened to block 58 by means of a resistant plastic cement or solder or a mechanical gasketing procedure may be used. Block or cylinder 60 enclosed on its ends by blocks 58 and 59 respectively defines the outer perimeter of encircling space 57. The blocks are conveniently held together by bolts 61. Recesses 62 in block 59 may be used to anchor bolts whereby the cell assembly can be securely attached to extension or probe 21. Contact surface between the blocks may be provided with suitable gasketing materials but preferably they are so carefully fitted that good liquid seals are obtained by pressure alone exerted by means of bolts 61.

The standard or reference cell space 31 is provided with openings 70 and 71 through which the standard liquid having the desired refractive index may be introduced or removed as necessary. During operation of the instrument the openings are closed by convenient means not shown to retain the reference liquid. The reflecting surface of the refracted light beam returning mirror 33 is necessarily in direct contact with the reference liquid in the standard cell. The standard or reference liquid may be replaced if desired during operation of the process since this can be done rapidly and generally without affecting the process control seriously.

All, or part, of the liquid effluent from the process reactor or mixer passes as a continuous stream into the sample cell by way of 2 and through conduit 63 into the light beam region 30 and thence by way of conduit 64 into encircling zone or space 57. Space 57 is divided longitudinally by baffle 65 so that the sample liquid on entering 57 is forced to travel circumferentially through the encircling space and then to leave the refractometer by way of conduit 66 and exit pipe 5. By this means the sample liquid continuously maintains the entire cell assembly temperature uniform and prevents excessive variations in refraction which is a physical property varying significantly with temperature.

Figure 4:
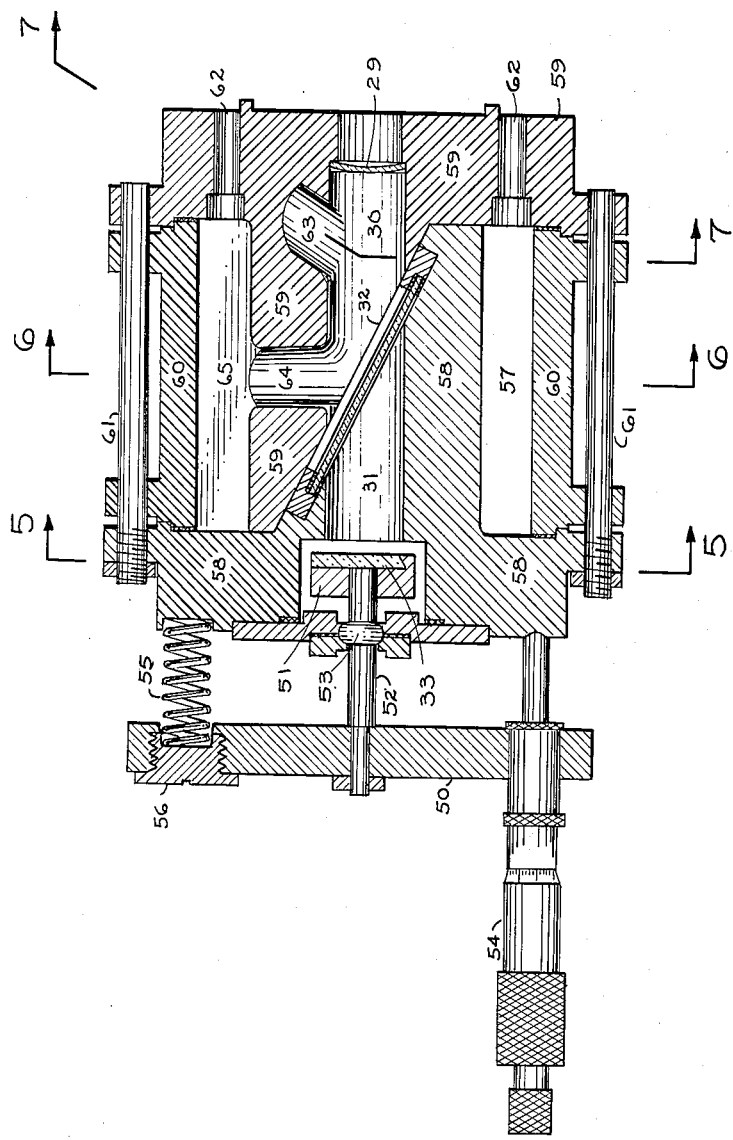
Figure 4 is a perpendicular cross-section of the refractometer cell assembly.

The refractometer cell assembly of this invention is particularly unique. The assembly permits the maintenance of a uniform temperature in both the standard cell and in the sample cell, thereby eliminating or greatly minimizing variations in the refractive indices of the reference and the sample liquids. This is especially true if the volume of the effluent from the process or mixer in which the product is produced is of sufficient volume so that its relative heat capacity with respect to the refractometer assembly will be large. Therefore, if the volume of effluent produced is at a relatively low rate it will be necessary to pass all of it through the refractometer. If the effluent volume produced is at a high rate it will not be necessary to pass all of it through the refractometer. The minimum volume of effluent which, in general, will suffice to maintain uniform instrument temperature will depend upon the size of the assembly and its heat capacity and heat conductivity. For an assembly weighing about 20 pounds the effluent should be at least about 5 pounds per minute. A ratio of about ¼ pound of effluent per minute for each pound of refractometer cell assembly is the minimum requirement. A large flow rate will give better temperature control and the upper limit will be determined by frictional resistance in the unit.

Where the liquid effluent is a viscous material, e.g. of the order of 10 to 60 poises, the pathway of the effluent through the sample cell must be such as will offer minimum resistance to flow and must especially provide for a flow which will minimize striation while the effluent passes through the optical pathway of the light beam. The entrant angle of the effluent into the sample cell should be not less than about a right angle to the separating window between the sample cell and the reference cell. Thus in Figure 4 the angle of entrant conduit 63 is sufficient to avoid striations in the passing effluent or moving liquid. Sharp edges must be avoided in the passage-ways leading to the optical cell so as to avoid formation of bubbles and of stagnant areas where differences in temperature may result in consequent misleading variation in degrees of refraction. It is of course necessary that in inhomogeneities of all kinds, such as bubbles, striations, concentration differences, light reflecting solids and the like be absent from the effluent entering the cell.

The reference of standard fluid in the reference cell should have a refractive index as close as possible to that of the product effluent desired. Likewise, the reference fluid should have a refractive index which will vary with temperature to an extent very close to the variation with temperature of the process effluent. It is often possible to use effluent of the desired composition as the standard in the reference cell. However, where the effluent may be unstable with respect to time, temperature or light effects, or where further slow reactions, such as continued polymerization cannot be completely inhibited without significant alteration in optical properties, it will be necessary to find another standard liquid which will have the desired stability.

The apparatus of this invention is particularly and surprisingly effective in the automatic control of the single phase continuous catalytic process for the polymerization of vinyl acetate in alcoholic solution. Such a process involves the production of an effluent comprising an alcoholic solution of polyvinyl acetate having a viscosity between about 20 and 40 poises. By reference to Figure 1 it will be apparent how this process may be controlled to function continuously and automatically. The reactor 1 is continuously charged with vinyl acetate monomer through line 9 and controlled valve 8. Solvent, preferably methyl alcohol together with polymerization catalyst, such as a peroxide, and containing, if necessary, recovered monomer is fed into the reactor by way of line 11 and control valve 12. The reacted effluent from the reactor leaves by line 2 and passes through the refractometer 3 whereby the feed to the reactor is controlled by means of the continuous comparison of the optical refraction of the effluent with the refraction of the standard liquid as detailed under the discussion of the optical system and the sensing elements in preceding paragraphs. Effluent temperature variation of 5° C. in 30 minutes has not affected adversely the accuracy of control of the composition produced by the use of this refractometer servo mechanism. A process thus controlled has been operated successfully for many days with practically no need for manual control intervention.

A standard optical solution is preferably prepared from a mixture of glycerin and water. Such a standard has been found to have optical properties similar to those of the desired polyvinyl acetate effluent and in addition the glycerin-water mixtures are stable and easily reproducible.

While methyl alcohol is a preferred solvent for vinyl acetate polymerization, I am not limited thereto since other solvent alcohols may be used, such as ethyl, propyl and butyl alcohols and their isomers may be used. Also, mixtures of solvents may be used, the requirement being merely that the polymerization product be soluble therein. Solvent ethers and esters may be used and such other solvents as will not react undesirably with the components of the polymerization system.

This invention is not limited as to the type of product produced except that the product effluent must be optically clear otherwise, of course, the refraction of light will not be a measurable parameter and the process will not be controllable by my device.

This invention permits steady operation of the process and assists in eliminating extreme variations in degree of reaction or percentage composition of the product effluent. Steady operation in turn results in effluent varying but little in temperature and this in turn also tends to uniform functioning of the optical refractometer based control of the process.

Control by optical refractometry with the present device can be applied wherever two or more components are mixed or reacted provided of course, that the effluent is optically pervious. When the effluent is deeply colored there may be difficulty in using optical refraction, especially if the light returned from the refractometer cells has been greatly weakened as by absorption.

I claim:

1. A differential refractometer cell assembly comprising a sample cell providing minimal fluid passage resistance therethrough; an adjoining reference cell adapted to hold a reference liquid; an optically transparent window located obliquely between said sample cell and said reference cell; a circumferential shell defining a circumferential passage between said shell and said sample and reference cells; a lens in said sample cell to transmit a directed light beam through said sample cell, said transparent window and said reference cell; a reflecting mirror in said reference cell to reflect said light beam back through said reference cell, said transparent window and said sample cell and into said lens; an entry providing minimal fluid passage resistance for flowing liquid into said sample cell; an exit from said sample cell into said circumferential passage; and an exit from said circumferential passage at a point such that said flowing liquid passes around and in contact with said sample and reference cells.

2. The cell assembly of claim 1, wherein said reflecting mirror is attached by way of a rod and a ball socket seal to a mirror adjusting plate outside of said reference cell, the position of said mirror adjusting plate being adjustable by means of micrometers.

3. A differential refractometer cell assembly comprising a sample cell providing minimal fluid passage resistance therethrough, an adjoining reference cell adapted to hold a reference liquid, an optically transparent window located obliquely between said sample cell and said reference cell, a circumferential shell defining a circumferential passage between said shell and said sample and reference cells, an entry providing minimal fluid passage resistance for flowing liquid into said sample cell, an exit from said sample cell into said circumferential passage, and an exit from said circumferential passage at a point such that said flowing liquid passes around and in contact with said sample and reference cells.

4. The cell assembly of claim 3 in which the angle of the entry into the sample cell is not less than about a right angle to the transparent window located between the sample cell and reference cell.

References Cited in the file of this patent

UNITED STATES PATENTS

| | | |
|---|---|---|
| 2,583,973 | Stamm et al. | Jan. 29, 1952 |
| 2,612,814 | Glasser | Oct. 7, 1952 |
| 2,649,011 | Black | Aug. 18, 1953 |
| 2,724,304 | Crawford | Nov. 22, 1955 |
| 2,747,455 | Spracklen et al. | May 29, 1956 |
| 2,810,315 | Miller | Oct. 22, 1957 |
| 2,857,803 | Reinecke et al. | Oct. 28, 1958 |

OTHER REFERENCES

"Physical Chemistry of High Polymeric Systems," Mark et al., second edition, Interscience Pub. Inc., N.Y., 1950, p. 45.